United States Patent
Jiang et al.

(10) Patent No.: US 9,501,852 B2
(45) Date of Patent: Nov. 22, 2016

(54) METHOD AND APPARATUS FOR IMAGE FUSION

(71) Applicant: Nokia Technologies Oy, Espoo (FI)

(72) Inventors: An Jiang, Beijing (CN); Feng Cui, Beijing (CN); Qiwei Xie, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/155,368

(22) Filed: Jan. 15, 2014

(65) Prior Publication Data

US 2014/0205204 A1    Jul. 24, 2014

(30) Foreign Application Priority Data

Jan. 18, 2013  (CN) .......................... 2013 1 0024506

(51) Int. Cl.
G06K 9/36  (2006.01)
G06T 11/60  (2006.01)
G06T 5/50  (2006.01)

(52) U.S. Cl.
CPC  G06T 11/60 (2013.01); G06T 5/50 (2013.01)

(58) Field of Classification Search
USPC ............. 382/284, 190, 103; 250/221, 208.1; 340/12.25, 5.61, 5.64; 342/159, 175, 342/179; 348/218.1
See application file for complete search history.

(56) References Cited

U.S. PATENT DOCUMENTS 7,164,117 B2 * 1/2007 Breed et al. .................. 250/221
7,259,715 B1 * 8/2007 Garren et al. ................ 342/179
7,515,098 B1 * 4/2009 Garren et al. ................ 342/179
7,663,502 B2 * 2/2010 Breed ......................... 340/12.25
7,831,094 B2 * 11/2010 Gupta et al. .................. 382/190
8,755,636 B2 * 6/2014 Zhang et al. ................. 382/294
8,878,950 B2 * 11/2014 Lelescu et al. ............. 348/218.1

FOREIGN PATENT DOCUMENTS

| CN | 101359049 A | 2/2009 |
| CN | 101894365 A | 11/2010 |
| CN | 101984454 A | 3/2011 |
| CN | 102013095 A | 4/2011 |
| CN | 102005037 B | 6/2012 |
| EP | 1540575 A1 | 6/2005 |
| KR | 2005-0104663 A | 11/2005 |
| KR | 10-0551826 B1 | 2/2006 |
| WO | WO 2004/021264 A1 | 3/2004 |
| WO | 2011015822 A1 | 2/2011 |

OTHER PUBLICATIONS

Tico et al., "Motion-Blur-Free Exposure Fusion", 17th IEEE International Conference on Image Processing, Sep. 26-29, 2010, 4 pages.
Le et al., "High Dynamic Range Imaging Through Multi-Resolution Spline Fusion", 9th International Symposium on Signal Processing and Its Applications, Feb. 12-15, 2007, 4 pages.

(Continued)

Primary Examiner — Anh Do
(74) Attorney, Agent, or Firm — Alston & Bird LLP

(57) ABSTRACT

Embodiments of the present invention provide a method and apparatus for image fusion. A method for image fusion according to the embodiments of the present invention comprises: obtaining multiple images for a same scene; and calculating a fused image of the multiple images based on Bayes analysis by using a kernel function.

20 Claims, 5 Drawing Sheets

(56) References Cited

OTHER PUBLICATIONS

Nichol et al., "Satellite Remote Sensing for Detailed Landslides Inventories Using Change Detection and Image Fusion", International Journal of Remote Sensing, vol. 26, No. 9, May 10, 2005, pp. 1913-1926.

Li et al., "Multisensor Image Fusion Using the Wavelet Transform", IEEE International Conference on Image Processing, vol. 1, Nov. 13-16, 1994, pp. 51-55.

Nunez et al., "Multiresolution-Based Image Fusion with Additive Wavelet Decomposition", IEEE Transactions on Geoscience and Remote Sensing, vol. 37, No. 3, May 1999, pp. 1204-1211.

Tu et al., "A New Look at IHS-Like Image Fusion Methods", Information Fusion 2, 2001, pp. 177-186.

Baker et al., "Limits on Super-Resolution and How to Break Them", IEEE Transactions on Pattern Analysis and Machine Intelligence, vol. 24, Issue 9, Sep. 2002, 37 pages.

Qu et al., "Information Measure for Performance of Image Fusion", Electronics Letters, vol. 38, No. 7, Mar. 28, 2002, pp. 313-315.

Xydeas et al., "Objective Image Fusion Performance Measure", Electronics Letters, vol. 36, No. 4, Feb. 17, 2000, pp. 308-309.

Scheunders et al., "Fusion and Merging of Multispectral Images Using Multiscale Fundamental Forms", Journal of the Optical Society of America. A, Optics, Image Science and Vision, Oct. 18, 2001, 26 pages.

Osher et al., "Image Decomposition and Restoration Using Total Variation Minimization and the H-1 Norm", Multiscale Modeling and Simulation, Society for Industrial and Applied Mathematics, vol. 1, No. 3, 2003, pp. 349-370.

Aujol et al., "Constrained and SNR-based Solutions for TV-Hilbert Space Image Denoising", Journal of Mathematical Imaging and Vision. 26, 2006, pp. 217-237.

Zhang, "EM-based Bayesian Fusion of Hyperspectral and Multispectral Images", Image Fusion, Computer and Information Science, Computer Graphics, Chapter—6, Jan. 12, 2011, pp. 105-122.

Zhang et al., "Bayesian Fusion of Multispectral and Hyperspectral Image in Wavelet Domain", IEEE International Geoscience and Remote Sensing Symposium, Jul. 7-11, 2008, 2 pages.

Herwig et al., "Spatial Gaussian Filtering of Bayer Images with Applications to Color Segmentation", Color Image Processing Workshop, Oct. 8-9, 2009, 10 pages.

Inglada et al., "Low and High Spatial Resolution Time Series Fusion for Improved Land Cover Map Production", 6th International Workshop on Analysis of Multi-temporal Remote Sensing Images (Multi-Temp), Jul. 12-14, 2011, 4 pages.

"Image Fusion", The ORFEO Tool Box Software Guide, Updated for OTB-4, OTB Development Team, Chapter 13, Mar. 13, 2014, 1-5.

Fischer et al., "Diagnostic Accuracy of Whole-Body MRI/DWI Image Fusion for Detection of Malignant Tumours: a Comparison with PET/CT", European Radiology, Feb. 21, 2011, pp. 246-255.

Bulanon et al., "Image Fusion of Visible and Thermal Images for Fruit Detection", Biosystems Engineering, vol. 103, Issue 1, May 2009, pp. 12-22.

Yan et al., "Blind image deconvolution with spatially adaptive total variation regularization", Optics Letters, vol. 37, Issue 14, Jul. 15, 2012, pp. 2778-2780.

Hao et al., "Blind image deconvolution subject to bandwidth and total variation constraints", Optics Letters, vol. 32, Issue 17, Sep. 1, 2007, pp. 2550-2552.

Schowengerdt, "Remote Sensing: Models and Methods for Image Processing", 2nd ed. New York: Academic, 1997.

Li, et al.; "Multisensor Image Fusion Using the Wavelet Transform"; *Graphical Models and Image Processing*; vol. 57, No. 3, May; pp. 235-245; 1995.

Hardie, et al.; "MAP Estimation for Hyperspectral Image Resolution Enhancement Using an Auxiliary Sensor"; IEEE Transactions on Image Processing; vol. 13, No. 9; Sep. 2004; pp. 1174-1184.

Office Action from corresponding Chinese Patent Application No. 201310024506.1 dated Apr. 5, 2016.

Zhang et al., "Noise-Resistant Wavelet Based Bayesian Fusion of Multispectral and Hyperspectral Images"; IEEE Transactions on Geoscience and Remote Sensing; vol. 47, No. 11; Nov. 2000; pp. 3834-3843.

Zhirong; "Remote Sensing Image-Fusion Based on Bayesian Linear Estimation"; Sci China Ser F-Inf Sci; Apr. 2007; vol. 50, No. 2; pp. 227-240.

\* cited by examiner

METHOD AND APPARATUS FOR IMAGE FUSION

FIELD OF THE INVENTION

The present invention relates to the field of image processing, and more specifically, to the field of image fusion of multisource images.

BACKGROUND OF THE INVENTION

With the application of multisource images in many areas, image fusion has been an attractive and important technique of image processing and pattern recognition. Image fusion is to combine two or more source images into one single combined image containing significant information of respective source images. The application areas of image fusion include exposure fusion [1-2], remote sensing [3-4], medical imaging [5], quality and defect detection and biometric [6]. Particularly in mobile platform, there is a strong desire to fuse multisource images to obtain a better illustration and explanation about the sensed scene.

In image fusion, it is always desired that the fused image has both high spatial and high spectral resolutions so as to obtain a better description and interpretation of a sensed scene. However, due to physical or observation constraints, high spatial resolution and high spectral resolution are typically not simultaneously available. For example, high resolution images possess high spatial resolution but poor spectral resolution, while multispectral images possess high spectral resolution but low spatial resolution.

Image fusion should follow some fusion rules to construct a synthetic image. In this aspect, a variety of methods have been proposed to fuse high resolution images and multispectral data. For example, Nunez et al. [8] fuse a spatial resolution high resolution image (SPOT) with a low spatial resolution multispectral image (Landsat Thematic Mapper (TM)) by using the additive wavelet (AW) algorithm. The wavelet low frequency portion of the SPOT high resolution image is substituted by the bands of TM image.

However, those fusion methods perform fusion pointwisely and just use the local information of the neighborhood domain. Another shortcoming is that multiscale method preserves more spectral information but ignores some spatial information [9].

SUMMARY OF THE INVENTION

In view of the above, embodiments of the present invention provide a novel fusion solution, which performs image fusion based on Bayes analysis with introduction of a kernel function.

According to a first aspect of the present invention, there is provided a method for image fusion comprising: obtaining multiple images for a same scene; and calculating a fused image of the multiple images based on Bayes analysis by using a kernel function.

According to a second aspect of the present invention, there is provided an image fusion apparatus comprising: an acquiring unit configured to acquire multiple images for a same scene, and a fused image calculating unit configured to calculate a fused image of the multiple images based on Bayes analysis by using a kernel function.

According to a third aspect of the present invention, there is provided an apparatus for image fusion comprising: means for obtaining multiple images for a same scene; and means for calculating a fused image of the multiple images based on Bayes analysis by using a kernel function.

According to a fourth aspect of the present invention, there is provided an image fusion apparatus comprising: at least one data processor; and at least one memory coupled to the data processor, the memory storing a computer program, wherein the image fusion apparatus is configured to use the data processor and the memory to at least perform: obtaining multiple images for a same scene; and calculating a fused image of the multiple images based on Bayes analysis by using a kernel function.

With the solutions according to the embodiments of the present invention, multisource images (e.g., a high resolution image and a multispectral image) can be subject to global fusion, such that detail information of the high resolution image may be integrated into the fused image as much as possible and spectral information of the multispectral image may be preserved as much as possible.

BRIEF DESCRIPTION OF THE SEVERAL VIEWS OF THE DRAWINGS

Other objectives and effects of the present invention will become much apparent and easy to understand through the following description with reference to the accompanying drawings and with more comprehensible understanding of the present invention, wherein.

In all of the above accompanying drawings, like reference numbers indicate same, like or corresponding features or functions.

DETAILED DESCRIPTION OF THE INVENTION

Some preferred embodiments will be described in more detail with reference to the accompanying drawings, in which the preferred embodiments of the present disclosure have been illustrated. However, it may be understood by those skilled in the art that the present disclosure may be implemented in various manners, and thus should not be construed to be limited to the embodiments disclosed herein. Instead, these embodiments are provided for the thorough and complete understanding of the present disclosure, and to completely convey the scope of the present disclosure to those skilled in the art.

Figure 1A:
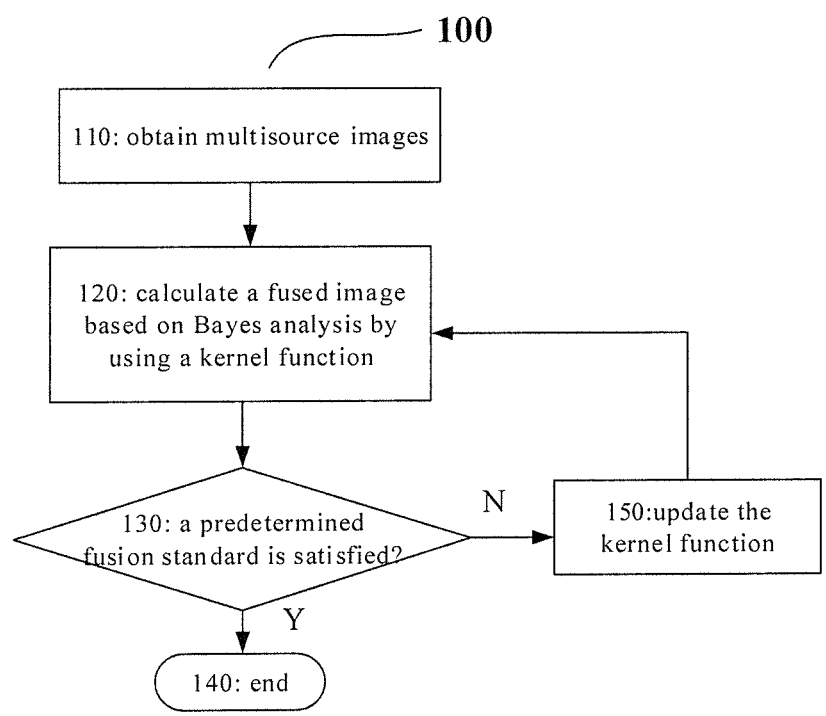
FIG. 1A illustrates a flow chart of a method for image fusion according to one embodiment of the present invention.

FIG. 1A shows a flow chart of a method 100 for image fusion according to one embodiment of the present invention. According to the embodiments of the present invention, the method 100 fuses multiple images (i.e. multisource images) for a same scene to obtain a fused image. In one embodiment of the present invention, multisource images include high resolution images with higher spatial resolutions and multispectral images with higher spectral resolutions.

The method 100 starts from step 110. In step 110, multiple images for a same scene are obtained. For example, the obtained multiple images comprise a high resolution image SI and a multispectral image ML.

Next, in step 120, a fused image of the multiple images is calculated based on Bayes analysis by using a kernel function.

Figure 1B:
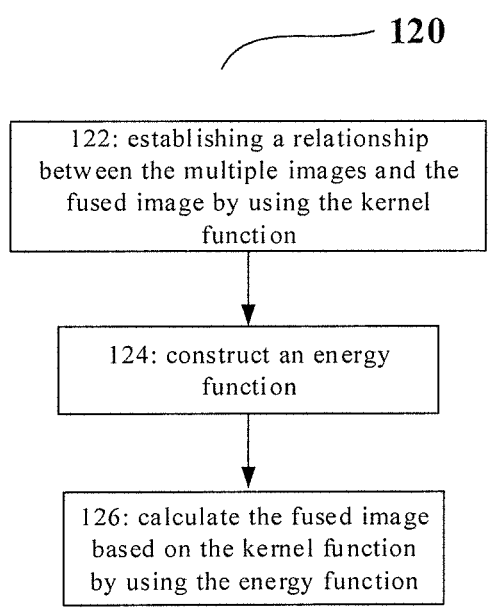
FIG. 1B illustrates a flow chart of a method step for calculating a fused image according to one embodiment of the present invention.

In one embodiment, the step 120 further comprises establishing a relationship between the obtained multiple images and the fused image R by using the kernel function, as shown in step 122 in FIG. 1B. FIG. 1B illustrates a flow chart of a method step 120 for calculating the fused image according to one embodiment of the present invention. Here, the fused image R is a result of image fusion of the multiple images (e.g., the high resolution image SI and the multispectral image ML). For example, the relationship may be expressed as:

$$ML = H*R + \eta, \quad (1)$$

where H denotes a kernel function, which is a complex factor reflecting the link between the multispectral image ML and the fused image R; $\eta$ denotes an unknown noise; and * denotes a convolution operator.

In one embodiment of the present invention, the kernel function H is a point spread function (PSF) commonly used in an image de-blurring processing. However, the present invention is not limited thereto, and any kernel function that satisfies the smoothness constraint may be applied to the present invention, which will be explained in detail hereinafter.

Next, in step 124, an energy function is constructed through the Bayes analysis as a function of the fused image R and the kernel function H based on the relationship established at step 122.

It is seen from equation (1) that given that only the multispectral image ML is known, it would be impossible to estimate the kernel function H and the fused image R. Therefore, the inventors establish a connection between the kernel function H, fused image R, and multispectral image ML according to the above equation (1) by using the Bayes analysis, as shown in the following equation:

$$p(R,H|ML) = p(ML|R,H)p(R|H)p(H), \quad (2)$$

where p(R,H|ML) represents a joint probability of the fused image R and the kernel function H given that the multispectral image ML is known, p(ML|R,H) denotes the likelihood (i.e., conditional probability) of the multispectral image ML given that the fused image R and the kernel function H are known, p(R|H) denotes the conditional probability of the fused image R given that the kernel function H is known, and p(H) denotes the prior probability of the kernel function H.

In one embodiment, the unknown noise $\eta$ is modeled as a set of independent and identically distributed random noise variables for all pixels, and each of the noise variables follows a Gaussian distribution with a mean of 0 and standard deviation of $\sigma_1$. Therefore, according to equation (1), p(ML|R,H) may be represented as:

$$p(ML|R,H) = \frac{1}{\left(\sqrt{2\pi}\,\sigma_1\right)^N} e^{\left(-\frac{1}{2\sigma_1^2}\|H*R-ML\|^2\right)} \quad (3)$$

where N denotes the total pixel number of an image such as the high resolution image SI, the multispectral image ML, or the fused image R, $\|\cdot\|$ represents a norm symbol, and $\|H*R-ML\|^2$ denotes a 2-norm of H*R−ML.

Since the kernel function H is independent of the image content, i.e., the probability of the kernel function H is independent of the probability of the fused image R, the second term on the right side of the equation (2) may be simplified as p(R|H)=p(R). Therefore, the equation (2) may be rewritten as:

$$p(R,H|ML) = p(ML|R,H)p(R)p(H). \quad (4)$$

Now, in order to estimate p(R,H|ML), some constraints are applied to the fused image R and the kernel function H. In order to integrate the detail information of the high resolution image SI into the fused image R, the gradient of the fused image R is defined as a gradient substantially equal to that of the high resolution image SI. More generally, in the embodiments of the present invention, the gradient of the fused image is set to be substantially equal to the gradient of the image with a higher spatial resolution among the obtained multiple images. In this way, the gradient of the difference between the fused image R and the high resolution image SI may be defined as complying with a Gaussian distribution with mean of 0 and standard deviation of $\sigma_2$. In this case, the prior probability p(R) of the fused image R may be defined as:

$$p(R) = \frac{1}{\left(\sqrt{2\pi}\,\sigma_2\right)^N} e^{\left(-\frac{1}{2\sigma_2^2}\|\nabla(R-SI)\|^2\right)}, \quad (5)$$

where $\nabla$ represents a gradient operator.

This definition method, for example, may refer to the definition of the prior probability of an image super-resolution gradient in the Reference [10].

As above mentioned, in the embodiments of the present invention, the kernel function H has a good smoothness. The smoothness of the kernel function H penalizes large gradients of the kernel function. Therefore, given that the gradient of the kernel function H is defined to follow a Gaussian distribution with mean of 0 and standard deviation of $\sigma_3$, it may be represented as:

$$p(H) = \frac{1}{\left(\sqrt{2\pi}\,\sigma_3\right)^N} e^{\left(-\frac{1}{2\sigma_3^2}\|\nabla(H)\|^2\right)}. \quad (6)$$

Now, in order to estimate the fused image R and the kernel function H, the negative logarithm of p(R,H|ML) is defined as an energy function $E_1(R,H)$. According to equations (2) and (4), $E_1(R,H)$ may be represented as:

$$E_1(R,H) = -\log(p(R,H|ML)) = -\{\log(p(ML|R,H)) + \log(p(R)) + \log(p(H))\}. \quad (7)$$

In this way, the maximum a posteriori (MAP) problem of equation (2) is converted into an energy minimization problem that minimizes $E_1(R,H)$. Further, by substituting equations (3), (5), and (6) into (7), the equation (7) may be transformed into:

$$E_1(R, H) = -\{\log(p(ML \mid R, H)) + \log(p(R)) + \log(p(H))\} = \quad (8)$$

$$N\log(\sqrt{2\pi}\,\sigma_1) + \left(\frac{1}{2\sigma_1^2}\|H*R - ML\|^2\right) + N\log(\sqrt{2\pi}\,\sigma_2) +$$

$$\left(\frac{1}{2\sigma_2^2}\|\nabla(R - SI)\|^2\right) + N\log(\sqrt{2\pi}\,\sigma_3) + \left(\frac{1}{2\sigma_3^2}\|\nabla(H)\|^2\right) =$$

$$\frac{1}{2\sigma_1^2}(\|H*R - ML\|^2 + \lambda_1\|\nabla(R - SI)\|^2 + \lambda_2\|\nabla H\|^2 + c)$$

where $c = 2\sigma_1^2(N \log(\sqrt{2\pi}\sigma_1) + N \log(\sqrt{2\pi}\sigma_2) + N \log(\sqrt{2\pi}\sigma_3))$, which is a constant, and $\lambda_1 = \sigma_1^2/\sigma_2^2$, $\lambda_2 = \sigma_1^2/\sigma_3^2$ Since the high resolution image SI is known, for the convenience of expression, the difference between the fused image R and the high resolution image SI is defined as Q=R−SI. Then, according to equation (8), an energy function E(Q, H) may be re-defined as:

$$E(Q,H) = 2\sigma_1^2 E_1(R,H) = \|H*Q + H*SI - ML\|^2 + \|\nabla(Q)\|^2 + \lambda_2\|\nabla(H)\|^2 + c \quad (9)$$

Till now, we have transformed the maximum a posteriori (MAP) problem of equation (2) into a problem that minimizes the energy function E(Q,H).

Next, in step 126, the fused image R is calculated according to the kernel function H by using the energy function constructed in step 124.

Further study the equation (9), where the energy function E(Q, H) includes two variables Q (or R) and H. When either Q or H is given, E(Q, H) is a convex function. Therefore, when the kernel function H is given, the equation (9) may be rewritten into a frequency domain form by discarding the terms unrelated to Q:

$$E(F(Q)) = \|F(H)°F(Q) + F(W)\|^2 + \lambda_1\|F(\partial_x)°F(Q)\|^2 + \lambda_1\|F(\partial_y)°F(Q)\|^2, \quad (10)$$

where F denotes Fourier transformation, W=H*SI−ML, $\partial_x$ and $\partial_y$ are differential operators in x and y directions, $F(\partial_x)$ and $F(\partial_y)$ are the Fourier transformations of respective differential operators, and ° denotes component-wise multiplication (i.e., dot product).

Next, Plancherel's theorem, which states that the sum of the squares of functions equals to the sum of the squares of their Fourier transformations, are used to construct the equation $$\frac{\partial E(F(Q))}{\partial F(Q)} = \frac{\partial E(Q)}{\partial Q}$$

for all possible values of Q.

Therefore, the first order optimality condition may be written as $$\frac{\partial E(F(Q))}{\partial F(Q)} = 0.$$

Namely:

$$\frac{\partial E(F(Q))}{\partial F(Q)} = \overline{F(H)}°(F(H)°F(Q) + F(W)) + \quad (11)$$

$$\lambda_1 \overline{F(\partial_x)}°F(\partial_x) + \lambda_1 \overline{F(\partial_y)}°F(\partial_y))°F(Q) = 0.$$

It is seen from equation (11) that given the kernel function H, Q may be derived, thereby the fused image R (R=Q+SI) may be derived.

In one embodiment, a rectangular window function is used as the initial kernel function H to obtain the fused image R.

According to some embodiments of the present invention, the kernel function H and the fused image R are iteratively updated to optimize the obtained fused image R.

Refer back to FIG. 1, in order to optimize the fused image R derived in step 120, in step 130, it is determined whether a predetermined fusion standard (or called convergence condition) is satisfied.

In one embodiment, the predetermined fusion standard is times of updating. For example, the times of updating may be any positive integer, e.g., 10, 20, 30, 40, etc., as needed.

In another embodiment, the predefined fusion standard is the quality of the calculated fused image R. For example, it may evaluate whether the quality of the fused image R satisfies a predetermined standard through indexes such as visual sense, mutual information, and the like.

When it is determined in step 130 that the predetermined fusion standard is satisfied, the method 100 proceeds to step 140 where it ends.

When it is determined in step 130 that the predetermined fusion standard is not satisfied, the method 100 proceeds to step 150 to update the kernel function H by using the fused image R calculated in step 120.

According to one embodiment, the method of updating the kernel function H is similar to the method of calculating the fused image R through the above equations (10) and (11), except that it is the terms unrelated to the kernel function H that are discarded. Given that the fused image R is known, the equation (9) is rewritten into the frequency domain form:

$$E(F(H)) = \|F(R)°F(H) - F(ML)\|^2 + \lambda_2\|F(\partial_x)°F(H)\|^2 + \lambda_2\|F(\partial_y)°F(H)\|^2, \quad (12)$$

where R=Q+SI, and similar to the above equation (10), F denotes Fourier transformation, $\partial_x$ and $\partial_y$ are differential operators, $F(\sigma_x)$ and $F(\sigma_y)$ are Fourier transformations of respective differential operators, and ° denotes component multiplication (i.e., dot product).

Similarly, Plancherel's theorem is used to construct the equation $$\frac{\partial E(F(H))}{\partial F(H)} = \frac{\partial E(H)}{\partial H}$$

for all possible values of H.

Therefore, the first order optimality condition may be written as $$\frac{\partial E(F(H))}{\partial F(H)} = 0.$$

Namely:

$$\frac{\partial E(F(H))}{\partial F(H)} = \overline{F(R)}°(F(R)°F(H) - F(ML)) + \quad (13)$$

$$\lambda_2 \overline{F(\partial_x)}°F(\partial_x) + \lambda_2 \overline{F(\partial_y)}°F(\partial_y))°F(H) = 0.$$

It is seen from equation (13) that, given the fused image R, the updated kernel function H may be derived.

After updating the kernel function H in step 150, the method 100 may return to step 120 to optimize the fused image R based on the updated kernel function H.

The process of optimizing the fused image R is similar to the process of calculating the fused image R according to the kernel function H as depicted in the above step 120 (more specifically, the step 126 in FIG. 1B), except that the initial kernel function H in step 120 is replaced into the updated kernel function H calculated in step 150.

Figure 2:
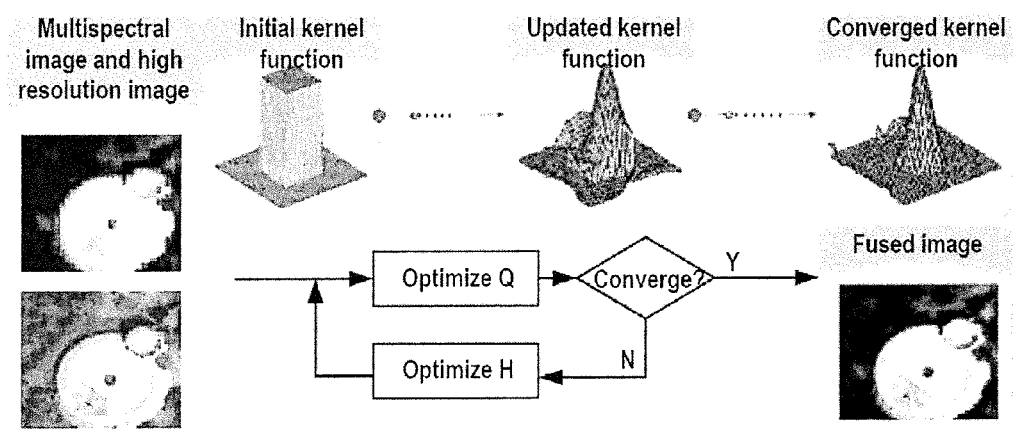
FIG. 2 exemplarily illustrates a process of optimizing a kernel function and a fused image according to the method illustrated in FIG. 1.

In this way, alternative iterative optimization of the kernel function H and the fused image R is realized through steps 120, 130, and 140. FIG. 2 exemplarily illustrates a process of alternatively and iteratively optimizing the kernel function H and the fused image R according to the method 100 illustrated in FIG. 1A.

Although the method of the present invention has been described with reference to method 100 in FIG. 1A, it should be appreciated that the order of the steps as illustrated in the figures and depicted in the description are only illustrative. Without departing from the scope of the claims, these method steps and/or actions may be performed in a different order, rather than being limited to the specific order as shown in the drawings and depicted in the description.

Figure 3:
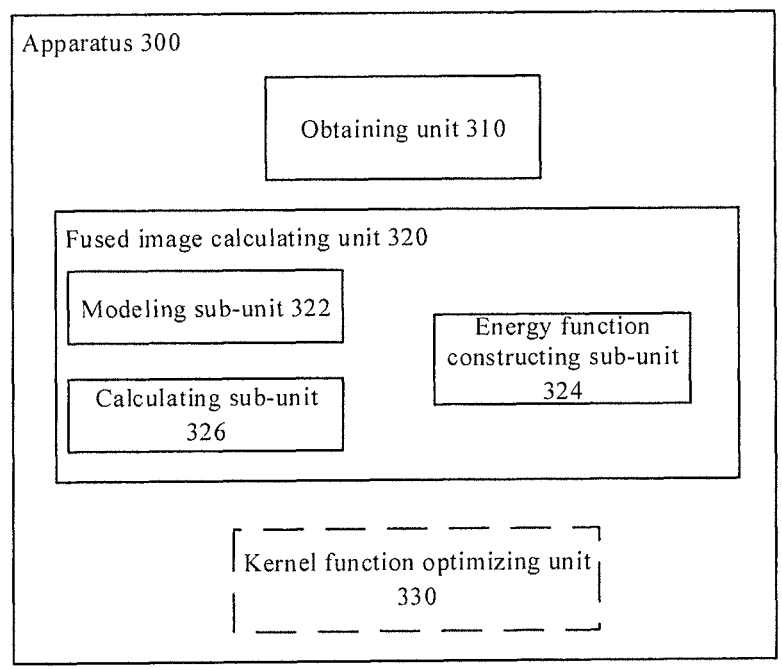
FIG. 3 illustrates a block diagram of an image fusion apparatus for image fusion according to the embodiments of the present invention.

FIG. 3 illustrates a block diagram of an apparatus 300 for image fusion according to the embodiments of the present invention. According to the embodiments of the present invention, the image fusion apparatus 300 fuses multisource images to obtain the fused image.

The image fusion apparatus 300 comprises an obtaining unit 310 configured to obtain multiple images for a same scene. For example, the obtained multiple images comprise a high resolution image SI and a multispectral image ML. The image fusion apparatus 300 further comprises a fused image calculating unit 320 configured to calculate a fused image of the multiple images based on Bayes analysis by using a kernel function. In one embodiment, the fused image calculating unit 320 further comprises: a modeling sub-unit 322 configured to establish a relationship between the multiple images obtained by the obtaining unit 310 and the fused image R by using the kernel function H; an energy function constructing sub-unit 324 configured to construct an energy function as the function of the fused image R and the kernel function H through Bayes analysis based on the relationship established by the modeling unit 322; and a calculation sub-unit 326 configured to calculate the fused image R based on the kernel function H by using the energy function constructed by the energy function constructing sub-unit 324.

In one embodiment, the gradient of the fused image R is set to be substantially equal to that of the high resolution image SI.

Furthermore, in one embodiment, the image fusion apparatus 300 further comprises a kernel function optimizing unit 330 configured to update the kernel function H by using the fused image R calculated by the fused image calculating unit 320 when a predetermined fusion standard is not satisfied. In one embodiment, the fused image calculating unit 320 is further configured to optimize the fused image R based on the kernel function H updated by the kernel function optimizing unit 330.

In one embodiment, a predetermined fusion standard is the times of updating. In another embodiment, the predefined fusion standard is the quality of the calculated fused image R.

Figure 4:
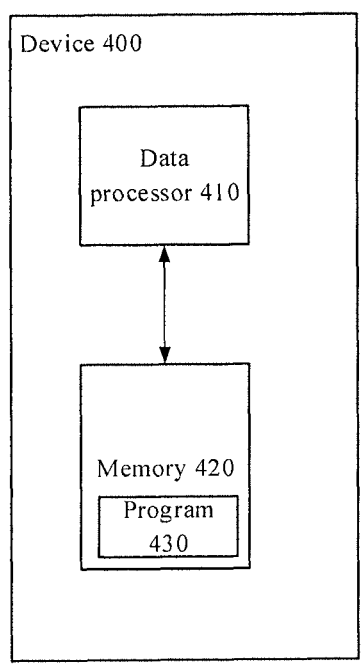
FIG. 4 schematically illustrates a block diagram of an image fusion apparatus according to the embodiments of the present invention.

FIG. 4 schematically shows a block diagram of an image fusion device 400 according to one embodiment of the present invention. As shown in FIG. 4, the image fusion device 400 comprises a data processor 410 and a memory 420 coupled to the data processor 410. The memory 420 stores a computer program 430.

The memory 420 may be of any appropriate type suitable for the local technical environment and may be implemented by any appropriate data storage technologies, including, but not limited to, a semiconductor-based storage device, a magnetic storage device and system, an optical memory, and a system. Although FIG. 4 merely shows one memory unit, the image fusion device 400 may have a plurality of physically different memory units. The data processor 410 may be of any appropriate type suitable for the local technical environment and may include, but not limited to, a general computer, a dedicated computer, a microprocessor, a digital signal processor (DSP) and one or more of the processor-based multi-core processor architectures. The image fusion device 400 may comprise a plurality of data processors.

As shown in FIG. 4, the image fusion device 400 is configured to use the data processor 410 and the memory 420 to at least perform: obtaining multiple images for a same scene; and calculating a fused image of the multiple images by using a kernel function based on Bayes analysis.

According to the embodiments of the present invention, the image fusion device 400 is further configured to use the data processor 410 and the memory 420 to at least perform: establishing a relationship between the obtained multiple images and the fused image R by using the kernel function H; constructing an energy function as the function of the fused image R and the kernel function H through Bayes analysis based on the established relationship; and calculating the fused image R based on the kernel function H by using the constructed energy function.

In one embodiment, the gradient of the fused image R is set to be substantially equal to that of the high resolution image SI.

According to some embodiments of the present invention, the image fusion device 400 is further configured to use the data processor 410 and the memory 420 to at least perform: updating the kernel function H by using the calculated fused image R when a predetermined fusion standard is not satisfied. In one embodiment, the image fusion device 400 is further configured to use the data processor 410 and the memory 420 to at least perform: optimizing the fused image R based on the updated kernel function H.

In one embodiment, the predetermined fusion standard is the times of updating. In another embodiment, the predetermined fusion standard is the quality of the calculated fused image R.

In the description of the present disclosure, a high resolution image and a multispectral image are taken as examples to describe various embodiments. However, those skilled in the art would appreciate that the present invention is not limited to a high resolution image and a multispectral image, but may be applied to any multisource images having complementary features. Besides, in the description of the present disclosure, various embodiments are depicted with two images as examples. However, those skilled in the art would appreciate that the number of images for performing image fusion according to the present invention is not limited to 2, and the image fusion may be performed for any number of multisource images. When the number of images to be fused is greater than 2, in one embodiment, 2 images there among are first fused according to the above image fusion method described with reference to FIG. 1A and FIG.

1B, and then the obtained fused image is further fused with a next image, and so on and so forth. In another embodiment, a link is established between the multiple images and a kernel function, and then a corresponding energy function is constructed.

Figure 5:
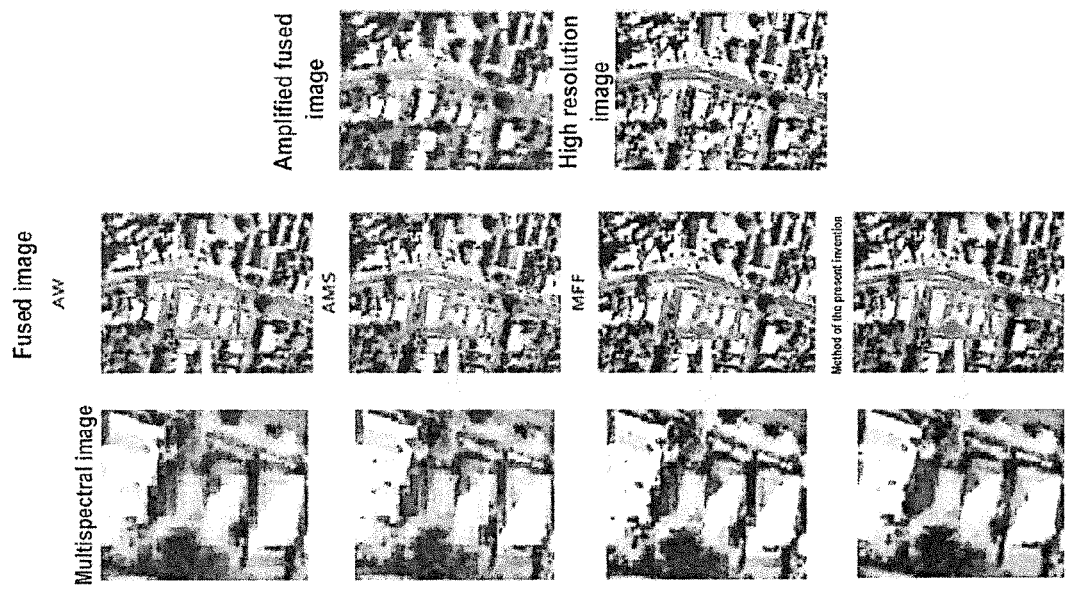
FIG. 5 exemplarily illustrates a comparison between a fused image generated by the image fusion solution according to the embodiments of the present invention and a fused image generated by the image fusion solution in the prior art.

FIG. 5 exemplarily illustrates a comparison between a fused image generated by the image fusion solution according to the present invention and a fused image generated by the image fusion solution in the prior art. As shown in FIG. 5, simulation is executed using a QUICKBIRDS test image, where simulation results from comparison between the solution of the present invention and classical point-wise image fusion solution (e.g., additive wavelet (AW) [8], area-based maximum selection rule (AMS) [7], and multi-scale fundamental forms method (MFF) [13]) are shown. In the experiment results of the present invention shown in FIG. 5, it is selected $\lambda_1=2$ and $\lambda_2=8$ (which are empirical values), and the predetermined fusion standard is to perform 20 times of iterative updating. The initial kernel function H is selected as a rectangular window function with a size of M×N, represented as:

$$H = \begin{cases} 1/((M_2 - M_1) \cdot (N_2 - N_1)) & \text{if } M_1 \leq i \leq M_2 \text{ and } N_1 \leq j \leq N_2 \\ 0 & \text{otherwise,} \end{cases}$$

where $M_1$, $M_2$, $N_1$ and $N_2$ are positive integers satisfying the condition of $0<M_1 \leq M_2<M$, $0<N_1 \leq N_2<N$. In the experiment, M=37, N=37, $M_1$=12, $M_2$=26, $N_1$=12, and $N_2$=26 are selected.

Figure 6:
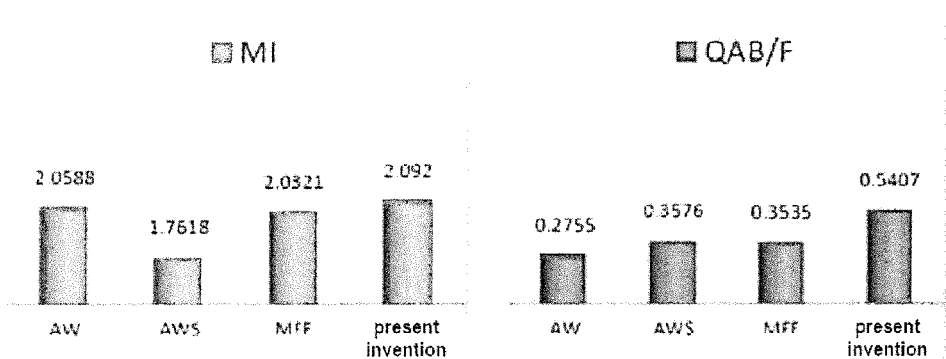
FIG. 6 illustrates a quantitive comparison between the fusion results in FIG. 5.

FIG. 6 illustrates a quantitive comparison between the fusion results in FIG. 5. Here, in order to measure the improvement of the fused image, mutual information MI metric [11] and $Q^{AB/F}$ metric [12] are used. Larger values of the mutual information MI metric and the $Q^{AB/F}$ metric represent that the finally resulting fused image contains more information from the source images. It is seen from FIG. 6 that the mutual information MI and the $Q^{AB/F}$ of the image resulting from the solution of the present invention have larger values than those obtained from other prior art fusion methods.

It is seen from the above description that the solutions of the embodiments of the present invention have the following advantages: (1) by setting the gradient of the fused image to be substantially equal to the gradient of the high resolution image, the fused image contains as much detail information of the high resolution image as possible; (2) by introducing a kernel function to construct an arithmetic model between a multispectral image and the fused image, the spectral information of the multispectral image is preserved as much as possible; (3) different from the conventional point-wise fusion only using the information of the neighborhood domain, the solutions of the embodiments of the present invention can achieve global fusion, thereby eliminating or reducing the block effect of the resulting fused image.

It should be noted that for the sake of a concise depiction, the above description omits the process of pre-processing the multispectral image ML and the high resolution image SI. Those skilled in the art would appreciate that, before performing image fusion, the high resolution image SI and the multispectral image ML (e,g., as obtained in above step 110) should have been aligned with a consistent pixel bit-width.

It should be noted that in order to make the present invention more comprehensible, the above description omits some more specific technical details which are known to the skilled in the art and may be necessary to implement the present invention.

Thus, selecting and describing the preferred embodiments is to better illustrate the principle and practical application of the present invention and to enable those skilled in the art to appreciate that without departing the spirit of the present invention, all modifications and alterations fall within the protection scope of the present invention as limited by the appending claims.

Further, those skilled in the art may understand, the steps of various methods as above described may be implemented by a programmed computer. Here, some embodiments intend to cover program storage means that is machine or computer-readable and encoded with machine-executable or computer-executable instruction programs, and the instructions implement some or all steps of the above methods. The program storage means may be a magnetic storage medium, for example, a disc, a diskette, a hard disk driver, or an optical readable digital data storage medium. The embodiments also intend to cover a computer that is programmed to perform the steps of the method.

REFERENCES

[1] Marius Tico, Natasha Gelfand, and Kari Pulli, Motion-blur-free exposure fusion, 17th IEEE International Conference on Image Processing, 3321-3324 (2010).

[2] Hung-Son Le, Adi Anani and Haibo Li, High dynamic range imaging through multi-resolusion spline fusion, International Symposium on Signal Processing and its Applications. 1-4 (2007).

[3] J. Nichol and M. S. Wong, Satellite remote sensing for detailed landslides inventories using change detection and image fusion, Int. J. Remote Sens. 26, 1913-1926 (2005).

[4] R. A. Schowengerdt, Remote Sensing: Models and Methods for Image Processing, 2nd ed. New York: Academic, 1997.

[5] Michael A. Fischer, et al., Diagnostic accuracy of whole-body MRI/DWI image fusion for detection of malignant tumours: a comparison with PET/CT, Molecular Imaging. 21 (2), 246-255 (2011).

[6] Bulanon, D. M., Burks T. F. and Alchanatis, V., Image fusion of visible and thermal images for fruit detection, Biosystems Engineering, 103 (1), 12-22 (2009).

[7] L. Hui, B. S. Manjunath and S. K. Mitra, \Multisensor image fusion using the wavelet transform," Graphical Models and Image Processing. 57, 235-245 (1995).

[8] J. Nunez, X. Otazu, O. Fors, A. Prades, V. Pala, and R. Arbiol, Multiresolution based image fusion with additive wavelet decomposition," IEEE Transactions on Geoscience and Remote Sensing. 32, 1204-1211 (1999).

[9] T. Te-Ming, S. Shun-Chi, S. Hsuen-Chyun, and H. S. Ping, \A new look at IHS-like image fusion methods," Information Fusion. 2, 177-186 (2001).

[10] S. Baker and T. Kanade, Limits on Super-Resolution and How to Break Them," IEEE Transactions on Pattern Analysis and Machine Intelligence. 24, 1167-1183 (2002).

[11] G. Qu, D. Zhang and P. Yan, Information measure for performance of image fusion," Electronics Letters. 38, 313-315 (2002).

[12] C. S. Xydeas and V. Petrovi, Objective Image Fusion Performance Measure," Electronics Letters. 36, 308-309 (2000).

[13] P. Scheunders and S. D. Backer, Fusion and merging of multispectral images using multiscale fundamental forms," Journal of the Optical Society of America A. 18, 2468-2477 (2001).

The invention claimed is:

1. A method for image fusion, comprising:
obtaining, via a processor, multiple images for a same scene;
calculating, via the processor a fused image of the multiple images based on Bayes analysis by using a kernel function; and calculating, via the processor, the fused image based on the kernel function by using a constructed energy function.

2. The method according to claim 1, wherein the calculating a fused image further comprises:
establishing a relationship between the multiple images and the fused image by using the kernel function; and
constructing the energy function as a function of the fused image and the kernel function through the Bayes analysis based on the relationship.

3. The method according to claim 1, wherein a gradient of the fused image is set to be substantially equal to that of an image with a higher spatial resolution among the multiple images.

4. The method according to claim 1, further comprising:
updating the kernel function by using the calculated fused image when a predetermined fusion standard is not satisfied.

5. The method according to claim 4, further comprising:
optimizing the fused image based on the updated kernel function.

6. The method according to claim 4, wherein the predetermined fusion standard is at least one of
times of the updating and
quality of the calculated fused image.

7. The method according to claim 1, wherein the multiple images include a high resolution image and a multispectral image.

8. The method according to claim 1, wherein the kernel function includes a point spread function (PSF).

9. An apparatus, comprising at least one processor and at least one memory including a computer program code, wherein the at least one memory including the computer program code are configured, with the at least one processor, to cause the apparatus to:
obtain multiple images for a same scene;
calculate a fused image of the multiple images based on Bayes analysis by using a kernel function; and calculate the fused image based on the kernel function by using a constructed energy function.

10. The apparatus of claim 9, wherein the at least one memory including the computer program code is further configured to cause the apparatus to:
establish a relationship between the multiple images and the fused image by using the kernel function; and
construct the energy function as a function of the fused image and the kernel function through the Bayes analysis based on the relationship.

11. The apparatus of claim 9, wherein a gradient of the fused image is set to be substantially equal to that of an image with a higher spatial resolution among the multiple images.

12. The apparatus of claim 9, wherein the at least one memory including the computer program code is further configured to cause the apparatus to:
update the kernel function by using the calculated fused image when a predetermined fusion standard is not satisfied.

13. The apparatus of claim 12, wherein the at least one memory including the computer program code is further configured to cause the apparatus to:
optimize the fused image based on the updated kernel function.

14. The apparatus of claim 12, wherein the predetermined fusion standard is at least one of
times of the updating and
quality of the calculated fused image.

15. The apparatus of claim 9, wherein the multiple images include a high resolution image and a multispectral image.

16. The apparatus of claim 9, wherein the kernel function includes a point spread function (PSF).

17. A computer program product comprising at least one non-transitory computer-readable storage medium having computer-executable program code portions stored therein, the computer-executable program code portions comprising:
program code instructions causing a data processor to obtain multiple images for a same scene;
program code instructions causing the processor to calculate a fused image of the multiple images based on Bayes analysis by using a kernel function; and program code instructions causing the processor to calculate the fused image based on the kernel function by using the constructed energy function.

18. The computer program product of claim 17, further comprising program code instructions to
establish a relationship between the multiple images and the fused image by using the kernel function; and
construct the energy function as a function of the fused image and the kernel function through the Bayes analysis based on the relationship.

19. The computer program product of claim 17, wherein a gradient of the fused image is set to be substantially equal to that of an image with a higher spatial resolution among the multiple images.

20. The computer program product of claim 17, wherein the computer-executable program code portions further comprises program code to:
update the kernel function by using the calculated fused image when a predetermined fusion standard is not satisfied.

* * * * *

UNITED STATES PATENT AND TRADEMARK OFFICE
CERTIFICATE OF CORRECTION

| | | |
|---|---|---|
| PATENT NO. | : 9,501,852 B2 | Page 1 of 1 |
| APPLICATION NO. | : 14/155368 | |
| DATED | : November 22, 2016 | |
| INVENTOR(S) | : Jiang et al. | |

It is certified that error appears in the above-identified patent and that said Letters Patent is hereby corrected as shown below:

In the Claims

<u>Column 12,</u>
Line 30, "causing a data processor" should read --causing a processor--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*